United States Patent [19]

Eng et al.

[11] 4,356,353
[45] Oct. 26, 1982

[54] SAW-IMPLEMENTED TIME COMPANDOR

[75] Inventors: Kai Y. Eng, Parlin; On-Ching Yue, Hazlet, both of N.J.

[73] Assignee: Bell Telephone Laboratories, Incorporated, Murray Hill, N.J.

[21] Appl. No.: 209,147

[22] Filed: Nov. 21, 1980

[51] Int. Cl.$^3$ .............................................. H04B 1/66
[52] U.S. Cl. ............................................... 179/15.55 T
[58] Field of Search ................ 179/15.55 R, 15.55 T, 179/1.5 A; 364/725; 370/109; 358/142, 146

[56] References Cited

U.S. PATENT DOCUMENTS

| | | | |
|---|---|---|---|
| 3,697,682 | 10/1972 | Berg | 178/6.8 |
| 3,920,974 | 11/1975 | Means | 364/725 |
| 4,049,958 | 9/1977 | Hartmann | 364/725 |
| 4,300,161 | 11/1981 | Haskell | 358/142 |

OTHER PUBLICATIONS

Morgen et al., "Time Compression Multiplexing . . . ", IEEE Trans. on Comm., Dec. 1974, pp. 1932–1939.
Gerard et al., "The Design and Applications of Highly Dispersive Surface Wave Filters", IEEE Trans. Microwave, Apr. 1973.
Flood et al., "Time Compression Multiplex Transmission", Proc. IEE, Apr. 1964, pp. 647–668.
Morgen, "Time Compression Multiplexing . . . ", Ph.D Dissertation, Columbia U., 1974.

Primary Examiner—Emanuel S. Kemeny
Attorney, Agent, or Firm—Erwin W. Pfeifle

[57] ABSTRACT

The present invention relates to a time compandor (40) including a cascaded pair of chirp transformers (41,42) of chirp rates $\beta$ and $\sigma$, respectively, capable of companding a continuous time signal x(t) to form a companded and delayed output signal $x(a[t-\tau])$. Each chirp transformer includes a pi-network arrangement of linear dispersive filters (44,45,46,47,48,49), wherein the first chirp transformer (41) performs a Fourier transform on a continuous time input signal x(t) to produce $X(\beta t)$ and the second chirp transformer (42) performs an inverse Fourier transform on the product of the output of the first chirp transformer and a signal associated with the desired time delay $\tau$, to form the desired companded output signal $x(\sigma/\beta[t-\tau])$, where $\sigma/\beta = \alpha$ is the desired companding rate, and $\tau$ is the desired time delay.

10 Claims, 4 Drawing Figures

SAW-IMPLEMENTED TIME COMPANDOR

BACKGROUND OF THE INVENTION

1. Field of the Invention

The present invention relates to a time compandor whose output is proportional to the time compressed (or expanded) version of the input, and more particularly, to a time compandor which, in implementation, utilizes the real-time Fourier transforming properties of surface acoustic wave (SAW) devices.

2. Description of the Prior Art

Frequency and time division multiplexing arrangements are common methods for efficiently utilizing the available bandwidth in a communication system. Still another, lesser known arrangement is called time compression multiplexing. In time compression multiplexing, a signal from each input channel is stored for a short period of time. The signals from all channels are then read from the store, compressed in time and transmitted sequentially, one after the other, over the communication path. See, for example, the publication by J. E. Flood et al, "Time-Compression-Multiplex Transmission", *Proceedings of the IEE*, Vol. 111, No. 4, April 1964, pp. 647-668.

For over a decade, however, time compression multiplexing (TCM) has not been achieved for a class of complex signals, including, but not limited to, video and speech signals, due to the state-of-the-art of the building block components of the existing compandor arrangements. The problem remaining in the prior art, therefore, is to provide a time compandor which is capable of achieving time compression multiplexing of complex signals.

SUMMARY OF THE INVENTION

The problem remaining in the prior art has been solved in accordance with the present invention which relates to a time compandor whose output is proportional to the time compressed (or expanded) version of the input, and more particularly, to a compandor which, in implementation, utilizes the real-time Fourier transforming properties of surface acoustic wave (SAW) devices.

It is an aspect of the present invention to utilize SAW devices, specifically banks of linear dispersive filters, to separately compand each signal, via real-time Fourier transform techniques, before multiplexing the signals together to form the composite transmitted signal. By first companding each signal in its associated bank of linear dispersive filters before multiplexing the signals together, signal distortion and inter-signal interference may not occur, and the separate signals may be accurately recovered and expanded accordingly.

Other and further aspects of the present invention will become apparent during the course of the following description and by reference to the accompanying drawings.

DETAILED DESCRIPTION

Figure 1:
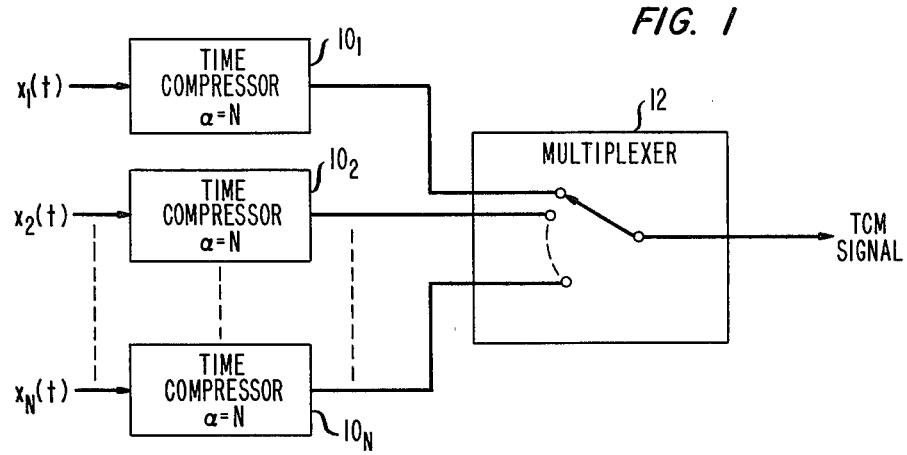
FIG. 1 illustrates an exemplary time-compressor arrangement formed in accordance with the present invention.

Time compandors, as such, may be utilized as either time compressors or time expandors, and in both capacities are employed in Time Compression Multiplexing (TCM), which is a means of transmitting multiple signals over a common medium. A TCM arrangement employing time compressors formed in accordance with the present invention is illustrated in FIG. 1, where TCM is accomplished by time compressing segments of each signal to be transmitted. For example, if N signals $x_1(t)$, $x_2(t)$, ... $x_N(t)$ are to be multiplexed, each signal is applied as an input to a separate one of N time compressors $10_1$-$10_N$. Specifically, signal $x_1(t)$ is applied as an input to time compressor $10_1$, signal $x_2(t)$ is applied to compressor $10_2$ and likewise, signal $x_N(t)$ is applied as an input to time compressor $10_N$. Compressors $10_1$-$10_N$ each compress its associated signal by a predetermined factor $\alpha$, and introduce the appropriate delay $\tau$. More particularly, an exemplary section of input signal $x(t)$ of duration T is compressed to a duration of $T/\alpha$, where $\alpha = N$, and delayed by the factor $(N-1)T/\alpha$. The N compressed signals $x_1(\alpha t)$, $x_2(\alpha t - T)$ . . . , $x_N(\alpha t - (N-1)\tau)$ are applied as inputs to a multiplexer 12. The output of multiplexer 12, will contain the N compressed input signals, which will occupy, for example, the same period of time, T, as a single original section of an input signal.

Figure 2:
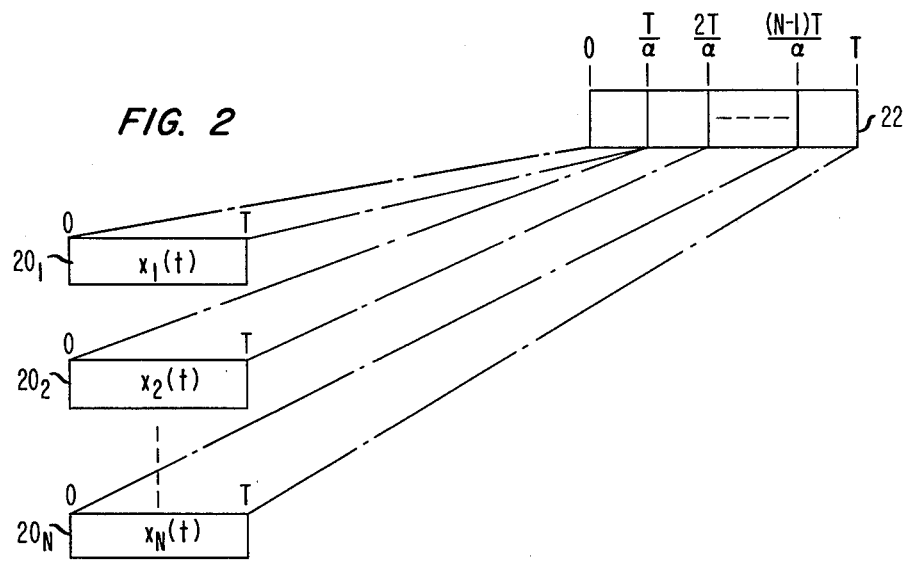
FIG. 2 contains an exemplary pre- and post-compression time frame illustrating the operation of the exemplary compressor arrangement of FIG. 1.

An exemplary execution of the above-described compressing process is illustrated in FIG. 2, which includes pre-compression time frames $20_1$-$20_N$ and a post-compression time frame 22. Pre-compression time frames $20_1$-$20_N$ are sections of the N separate original input signals, each section of duration T. By compressing each signal by the factor $\alpha$, the entire plurality of signal sections will fit into a single time frame of duration T, as seen by reference to post-compression time frame 22 of FIG. 2.

Figure 3:
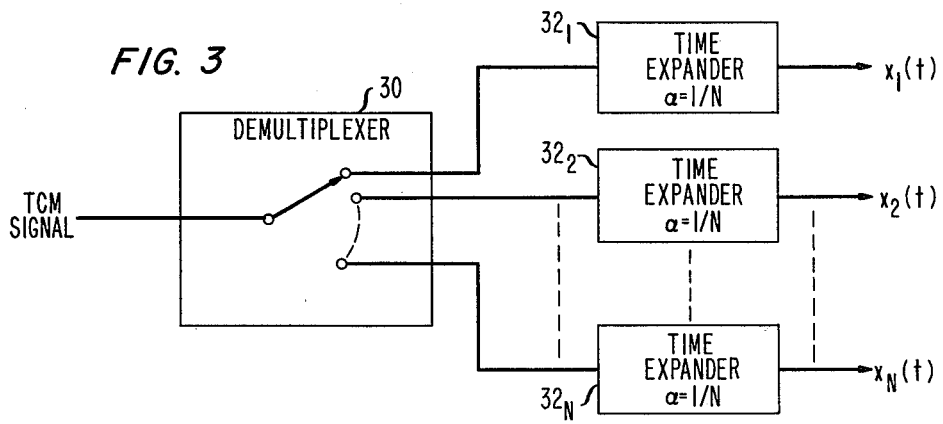
FIG. 3 illustrates an exemplary time-expandor arrangement formed in accordance with the present invention.

The compressed multiplexed signal, after transmission through the medium arrives at a receiver of the form illustrated in FIG. 3. The compressed multiplexed signal is applied as an input to a demultiplexer 30, which separates the signal back into the original N compressed signals, $x_1(\alpha t)$, $x_2(\alpha t - T)$, ... $x_N(\alpha t - (N-1)T)$, where each compressed signal is applied as an input to a separate one of N time expandors $32_1$-$32_N$. Specifically, compressed signal $x_1(\alpha t)$ is applied as an input to time expandor $32_1$, $x_2(\alpha t - T)$ is applied to time expandor $32_2$, and likewise, with compressed signal $x_N(\alpha t - (N-1)T)$ applied as an input to time expandor $32_N(\alpha t)$. Each expandor of $32_1$-$32_N$ performs the inverse operation of its associated time compressor $10_1$-$10_N$ of FIG. 1. In particular, the performance of an exemplary time expandor may be described by reference to above-mentioned FIG. 2, where the sequence of operations described in association with FIG. 2 is reversed to expand the received signal. Specifically, each separate compressed signal $x_1(\alpha t)$, $x_2(\alpha t - T)$, ... $x_N(\alpha t - (N-1)T)$ is expanded by the same factor $\alpha$ as defined hereinabove in association with the compressing process illustrated in FIG. 1. Therefore, each recovered signal, in its expanded form, is of the same duration, T, as the original set of input signals.

In accordance with the principles of the present invention, Fourier transform techniques are applied to perform the companding process, where the Fourier transform of x(t) is defined as $$X(\omega) = \int_{-\infty}^{\infty} x(t)\exp(-i\omega t)dt. \quad (1)$$

The desired compandor output signal, $x(\alpha[t-\tau])$, is obtained by applying a three-step set of operations to the transform of eq. (1): (1) multiplying the above-described transform $X(\omega)$ by the factor $\alpha^{-1}\exp(-i\alpha\omega\tau)$, (2) changing the frequency variable from $\omega$ to $\omega/\alpha = \Omega$, and (3) taking the inverse Fourier transform of the result of the second operation. The result of this process is the desired companded output signal, as can be determined by analysis of the following sequence of equations, which illustrates the inverse Fourier transform resulting from the third step of the above-described set of operations:

$$F^{-1}X(\omega/\alpha) = \int_{-\infty}^{\infty} X(\omega/\alpha)\exp(-i\omega\tau)\exp(i\omega t)d\omega/2\pi\alpha \quad (2)$$

$$= \int_{-\infty}^{\infty} X(\Omega)\exp(-i\alpha\Omega\tau)\exp(i\alpha\Omega t)d\Omega/2\pi$$

$$= \int_{-\infty}^{\infty} X(\Omega)\exp(i\sigma\Omega[t - \tau]d\Omega/2\pi$$

$$= x(\alpha[t - \tau]).$$

In accordance with the present invention, surface acoustic wave (SAW) devices, particularly, linear dispersive filters (LDF), are employed to achieve the above-described Fourier transform/inverse Fourier transform method of signal companding, where the linear dispersive filters are combined to form chirp transformers. The analytic signal (i.e., no negative frequency components) representation of the impulse response of the ideal LDF is $$h(t;\beta) \overset{\Delta}{=} \exp(i\omega_o t + i\beta t^2/2). \quad (3)$$

The instantaneous frequency of $h(t;\beta)$, $\omega_o + \beta t$, varies linearly with time; thus, $h(t;\beta)$ is a chirped signal with chirping rate $\beta$ rad/sec.

Denoting convolution and complex conjugate by ⊛ and ⊛, respectively, a real-time Fourier transform may be obtained through employing a plurality of linear dispersive filters comprising the above-described impulse response in the following chirp transform method. Assuming the input signal is x(t), and g(t) is the chirped transform, $$g(t) \overset{\Delta}{=} h^*(t;\beta)\{h(t;\beta) \circledast [h(t, -\beta)x(t)]\} \quad (4)$$

$$= h^*(t;\beta) \int_{-\infty}^{\infty} x(u)\exp[i\omega_o u - i\beta u^2/w]\exp[i\omega_o(t-u) +$$

$$i\beta(t-u)^2/2]du$$

$$= h^*(t;\beta)\exp[i\omega_o t + i\beta t^2/2] \int_{-\infty}^{\infty} x(u)\exp[-i(\beta t)u]du$$

$$= h^*(t;\beta)h(t;\beta) \int_{-\infty}^{\infty} x(u)\exp[-i(\beta t)u]du$$

$$= \int_{-\infty}^{\infty} x(u)\exp[-i(\beta t)u]du$$

$$= X(\beta t),$$

the Fourier transform of x(t). Similarly, the inverse Fourier transform is given by $$g(t) = h^*(t;-\sigma)\{h(t;\sigma) * [h(t;\sigma)X(t)]\} \quad (5)$$

$$= h^*(t;-\sigma)\exp[i\omega_o t - i\sigma t^2/2] \int_{-\infty}^{\infty} X(u)\exp[i(\sigma t)u]du$$

$$= h^*(t;-\sigma)h(t;-\sigma) \int_{-\infty}^{\infty} X(u)\exp[i(\sigma t)u]du$$

$$= \int_{-\infty}^{\infty} X(u)\exp[i(\sigma t)u]du$$

$$= 2\pi x(\sigma t).$$

Equations (4) and (5) are commonly referred to as chirp transforms.

Figure 4:
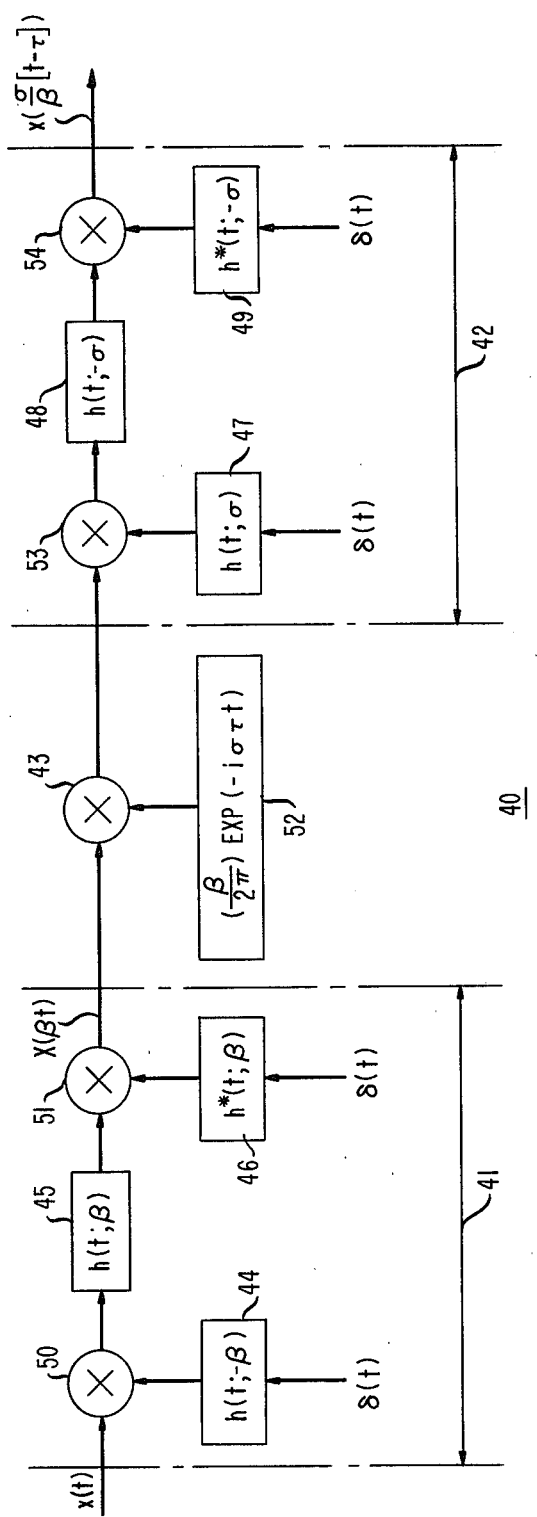
FIG. 4 illustrates a single exemplary time-compandor formed in accordance with the present invention.

An exemplary time compandor 40 formed in accordance with the present invention is illustrated in FIG. 4, where the term "compandor" is employed, rather than "compressor" or "expandor", since time compandor 40 may perform as either a time compressor or a time expander merely by changing the value of $\alpha$ from $\alpha = N$ for the compressor to $\alpha = 1/N$ for the expander. If the input signal x(t) is applied to compandor 40, the desired output signal will be $x(\alpha[t-\tau])$, where $\alpha = \sigma/\beta$ is the companding factor ($\alpha < 1$ for expanding and $\alpha > 1$ for compressing), and $\tau$ is the delay associated with the multiplexing of the signal.

The block diagram of time compandor 40, as illustrated in FIG. 4, consists of two chirp transformers 41 and 42, and an additional multiplier 43. An exemplary chirp transformer may be constructed with the above-described LDF building blocks, and in operation as will be described in greater detail hereinafter, will perform the above-described Fourier transform of the input signal. Therefore, a cascaded arrangement of two such chirp transformers, performing a Fourier transform, and subsequently, an inverse Fourier transform, will produce the desired companded output signal in accordance with equation (2).

In association with the impulse response $h(t;\beta)$ of an LDF as defined by eq. (3) and the chirp transform as defined by eq. (4), chirp transformer 41 of FIG. 4, in order to perform the required Fourier transform, may be constructed by forming a hybird-$\pi$ arrangement of three linear dispersive filters 44, 45 and 46, comprising an impulse response of $h(t;-\beta)$, $h(t;\beta)$ and $h^*(t,\beta)$, respectively. Similarly, chirp transformer 42 of FIG. 4, in order to perform the required inverse Fourier transform, may be constructed by forming a hybrid-$\pi$ arrangement of three linear dispersive filters 47, 48 and 49, comprising impulse response values of, in this case, $h(t;\sigma)$, $h(t;-\sigma)$ and $h^*(t;-\sigma)$, respectively. In order to perform the actual companding process, which will be described in greater detail hereinafter, an impulse function, δ(t), is applied as an input to linear dispersive filters 44, 46, 47 and 49.

In performing the companding process, an input signal x(t) and the impulse response, i.e., the output signal, of linear dispersive filter 44 are applied as inputs to a multiplier 50, where the output of multiplier 50 is convolved with linear dispersive filter 45. Subsequently, the convolved output of filter 45 and the impulse response of linear dispersive filter 46 are applied as inputs to a multiplier 51. The output of multiplier 51, which may also be considered as the output of chirp transformer 41, is therefore $X(\beta t)$, the real-time Fourier transform of the input signal x(t), since the above-described multiplying and convolving processes directly correspond to the Fourier transform as defined by eq. (4).

In accordance with the present invention, this Fourier transform, $X(\beta t)$ and a constant signal of value $(\beta/2\pi)\exp(-i\sigma\tau t)$, from a source 52, where $\beta$ is the above-defined chirp rate of chirp transformer 41, $\tau$ is defined as the desired delay, and $\sigma$ is defined as the chirp rate of chirp transformer 42, are applied as inputs to a multiplier 43, where the output of multiplier 43 is applied as an input to chirp transformer 42. Chirp transformer 42, in turn, will complete the companding process by performing an inverse Fourier transform on the above-described product, $(\beta/2\pi)\exp(-i\sigma\tau t) X(\beta t)$, to produce the desired companded output signal $x(\sigma/\beta[t-\tau])$.

In looking at the operation of chirp transformer 42 in detail, the output of multiplier 43 and the impulse response of linear dispersive filter 47 are applied as inputs to a multiplier 53, where the output of multiplier 53 is convolved with linear dispersive filter 48. The convolved output signal of filter 48 and the impulse response of linear dispersive filter 49 are applied as inputs to a multiplier 54, where the output of multiplier 54, which is also the output of chirp transformer 42, is the desired companded signal $x(\sigma/\beta[t-\tau])$.

Thus, the companding factor is $\alpha = \sigma/\beta$, and only the specifications of $\alpha$ and $\tau$ are necessary. Therefore, the optimum pair of chirp rates, $\sigma$ and $\beta$, may be chosen to both obtain the desired value $\alpha$ and facilitate the construction of the linear dispersive filters.

We claim:

1. A time compandor including
companding means (40) capable of being responsive to a continuous-time input signal and also capable of delaying and either one of expanding the time duration of said input signal and compressing the time duration of said input signal to produce a companded output signal including a predetermined companding factor ($\alpha$) and a predetermined time delay $\tau$
characterized in that
the companding means includes a cascaded arrangement of a first pi-network arrangement (41) comprising a separate linear dispersive filter in each branch of the pi, delay means (43,52) capable of multiplying the output signal from said first pi-network arrangement by a sinusoidal waveform whose frequency is proportional to the predetermined time delay ($\tau$), and a second pi-network arrangement (42) comprising a separate linear dispersive filter in each branch of the pi.

2. A time compandor in accordance with claim 1 characterized in that
the first pi-network arrangement is capable of receiving as an input the continuous-time input signal and performing a chirp transform including a predetermined chirp rate ($\beta$) thereon to produce a Fourier transform ($X(\beta t)$) of said input signal.

3. A time compandor in accordance with claim 2 characterized in that
the first pi-network arrangement includes
a first and a second linear dispersive filter (44,46) each capable of being responsive to an impulse input signal δ(t) to generate a separate impulse response output signal;
a first multiplier (50) capable of receiving as inputs the continuous-time input signal and said impulse response output signal of said first linear dispersive filter and producing as an output signal the product thereof;
a third linear dispersive filter (45) capable of receiving as an input the output of said first multiplier and producing as an output signal a convoluted version thereof; and
a second multiplier (51) capable of receiving as inputs the convoluted output signal of said third linear dispersive filter and the impulse response output signal of said second linear dispersive filter and producing as an output the Fourier transform of said input signal to said first pi-network arrangement.

4. A time compandor in accordance with claim 1 characterized in that
the second pi-network arrangement is capable of receiving as an input the output of the delay means and performing a chirp transform including a predetermined chirp rate ($\sigma$) thereon to produce an inverse Fourier transform equal to the companded output signal of the time compandor.

5. A time compandor in accordance with claim 4 characterized in that
the second pi-network arrangement (42) includes
a first and a second linear dispersive filter (47,49) each capable of being responsive to an impulse input signal (δ(t)) to generate a separate impulse response output signal;
a first multiplier (53) capable of receiving as inputs the output of the delay means and the impulse response output signal of said first linear dispersive filter and producing as an output signal the product thereof;
a third linear dispersive filter (48) capable of receiving as an input the output of said first multiplier and producing as an output signal a convoluted version thereof;
a second multiplier (54) capable of receiving as inputs the convoluted output signal of said third linear dispersive filter and the impulse response output signal of said second linear dispersive filter and producing an inverse Fourier transform equal to the companded output signal of the time compandor.

6. A time compandor in accordance with claims 1,2,3,4 or 5
characterized in that
the predetermined companding factor $\alpha$ is greater than unity, wherein the companding means is capable of compressing the time duration of the input signal.

7. A time compandor in accordance with claims 1,2,3,4 or 5 characterized in that
the predetermined companding factor $\alpha$ is less than unity, wherein the companding means is capable of expanding the time duration of the input signal.

8. A method of transforming a continuous-time input signal into a time-companded signal, where the time-companded signal is either one of a time-compressed version of said input signal and a time-expanded version of said input signal
characterized in that
the method comprises the steps of:
(a) performing a first chirp transform at a first chirp rate $\beta$ on the continuous-time input signal to produce a Fourier transform of said input signal;
(b) multiplying the result of step (a) by a sinusoidal waveform whose frequency is proportional to the predetermined time period ($\tau$) to produce a time delay in said Fourier transform; and
(c) performing a second chirp transform at a second chirp rate $\sigma$ on the result of step (b) to produce the time-companded and delayed signal.

9. The method according to claim 8 wherein linear dispersive filters are employed in performing the first chirp transform
characterized in that
the method comprises the further step of:
(d) in performing step (a), performing the steps of:
(1) applying an impulse input signal to a first linear dispersive filter to produce an impulse response output signal;
(2) multiplying the result of step (d)(1) with the time-continuous input signal;
(3) convolving the result of step (d)(2) with a second linear dispersive filter;
(4) applying an impulse input signal to a third linear dispersive filter to produce an impulse response output signal; and
(5) multiplying the result of step (d)(3) with the result of step (d)(4) to produce a Fourier transform of said time-continuous input signal.

10. The method according to claim 8 wherein linear dispersive filters are employed in performing the second chirp transform
characterized in that
the method comprises the further step of:
(d) in performing step (c), performing the steps of:
(1) applying an impulse input signal to a first linear dispersive filter to produce an impulse response output signal;
(2) multiplying the result of step (b) with the result of step (d)(1);
(3) convolving the result of step (d)(2) with a second linear dispersive filter;
(4) applying an impulse input signal to a third linear dispersive filter to produce an impulse response output signal; and
(5) multiplying the result of step (d)(3) with the result of step (d)(4) to produce the time-companded and delayed output signal.

* * * * *